(12) United States Patent
Murty et al.

(10) Patent No.: US 7,480,266 B2
(45) Date of Patent: Jan. 20, 2009

(54) INTERFERENCE ADAPTATION APPARATUS, SYSTEMS, AND METHODS

(75) Inventors: Ravi A. Murty, Portland, OR (US); Jr-Shian Tsai, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 10/999,750

(22) Filed: Nov. 30, 2004

(65) Prior Publication Data
US 2006/0135188 A1 Jun. 22, 2006

(51) Int. Cl.
*H04B 7/204* (2006.01)
(52) U.S. Cl. .................. 370/319; 370/332; 370/443; 370/462; 370/338; 370/445; 370/447; 370/468; 370/461; 455/63.1; 455/114.2; 455/278.1; 455/296; 375/141; 375/145; 375/240.13; 379/9.05
(58) Field of Classification Search .......... 370/332, 370/443–468, 338, 335; 455/63.1, 114.2, 455/278.1, 296
See application file for complete search history.

(56) References Cited

U.S. PATENT DOCUMENTS

| | | | | |
|---|---|---|---|---|
| 5,845,209 A | * | 12/1998 | Iwata | 455/423 |
| 6,112,071 A | * | 8/2000 | McCune, Jr. | 455/337 |
| 6,150,936 A | * | 11/2000 | Addy | 340/539.2 |
| 6,259,924 B1 | * | 7/2001 | Alexander et al. | 455/456.2 |
| 6,285,662 B1 | * | 9/2001 | Watanabe et al. | 370/280 |
| 6,704,346 B1 | * | 3/2004 | Mansfield | 375/136 |
| 2002/0039888 A1 | * | 4/2002 | Hama | 455/63 |
| 2003/0185173 A1 | * | 10/2003 | Min | 370/332 |
| 2004/0033789 A1 | * | 2/2004 | Tsien | 455/130 |
| 2004/0258012 A1 | * | 12/2004 | Ishii | 370/328 |
| 2004/0264423 A1 | * | 12/2004 | Ginzburg et al. | 370/338 |
| 2005/0239474 A9 | * | 10/2005 | Liang | 455/454 |
| 2005/0276276 A1 | * | 12/2005 | Davis | 370/447 |

OTHER PUBLICATIONS

Cali, F., "Dynamic tuning of the IEEE 802.11 protocol to achieve a theoretical throughput limit", *IEEE/ACM Transactions on Networking*, 8(6), (Dec. 2000), 785-799.

Tay, Y. C., et al., "A capacity analysis for the IEEE 802.11 MAC protocol", *Wireless Networks*, 7(2), (2001), 159-171.

* cited by examiner

*Primary Examiner*—Rafael Pérez-Gutiérrez
*Assistant Examiner*—Nimesh Patel
(74) *Attorney, Agent, or Firm*—Schwegman, Lundberg & Woessner, P.A.

(57) ABSTRACT

Apparatus and systems, as well as methods and articles, may operate to detect radio-frequency energy at a frequency associated with at least one wireless networking channel and to transmit a data frame responsive to determining that the radio-frequency energy is not associated with a wireless networking transmission.

16 Claims, 3 Drawing Sheets

INTERFERENCE ADAPTATION APPARATUS, SYSTEMS, AND METHODS

TECHNICAL FIELD

Various embodiments described herein relate to electronic communications generally, including apparatus, systems, and methods used to transmit and receive information via wireless networks.

BACKGROUND INFORMATION

Wireless networking devices may contend for access to a shared radio-frequency (RF) spectrum by following protocol rules. The rules may be designed to increase the likelihood of access by active devices. For example, some devices, such as those operating according to protocols including an Institute of Electrical and Electronic Engineers (IEEE) 802.11 protocol, may perform a transmission back-off operation that includes delaying transmission when a busy communications medium is detected. To reduce the probability of data collisions (caused by two or more transmitters operating at the same time during an idle period following a busy period), such devices may randomly choose a particular back-off delay period (one or more time "slots") within a maximum delay period, referred to as the "contention window."

The contention window may grow exponentially according to the protocol as the wireless networking device senses recurring instances of a busy medium condition and/or performs a back-off in response to each instance. The device may sense the busy medium condition by detecting RF energy in a received spectrum, perhaps originating from other wireless networking devices transmitting on the same channel(s), utilizing the same modulation technique, and/or obeying the same protocol (hereinafter referred to as "coherent energy"). On the other hand, in-band received energy may originate from an interference source (e.g., a microwave oven) not participating in the protocol. Such interference source operation may cause the contention window associated with the device to reach a maximum value, preventing and/or reducing transmissions from the device. System throughput may decrease as a result.

For more information regarding IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments.

DETAILED DESCRIPTION

As noted previously, some wireless networking devices may back off repeatedly and/or increase the size of a contention window in the presence of a non-coherent interferer, and may thereby forego the opportunity to transmit. System throughput may be sacrificed as a result. Some embodiments disclosed herein may operate to recover throughput lost due to this phenomenon by differentiating between coherent and non-coherent spectral energy, and by proceeding to transmit in the presence of non-coherent energy. This mode of "aggressive transmission" may optionally follow a single back-off, a back-off of limited duration, and other operational sequences that enable transmission in the presence of non-coherent energy while providing some degree of collision protection for other coherent wireless devices.

Figure 1:
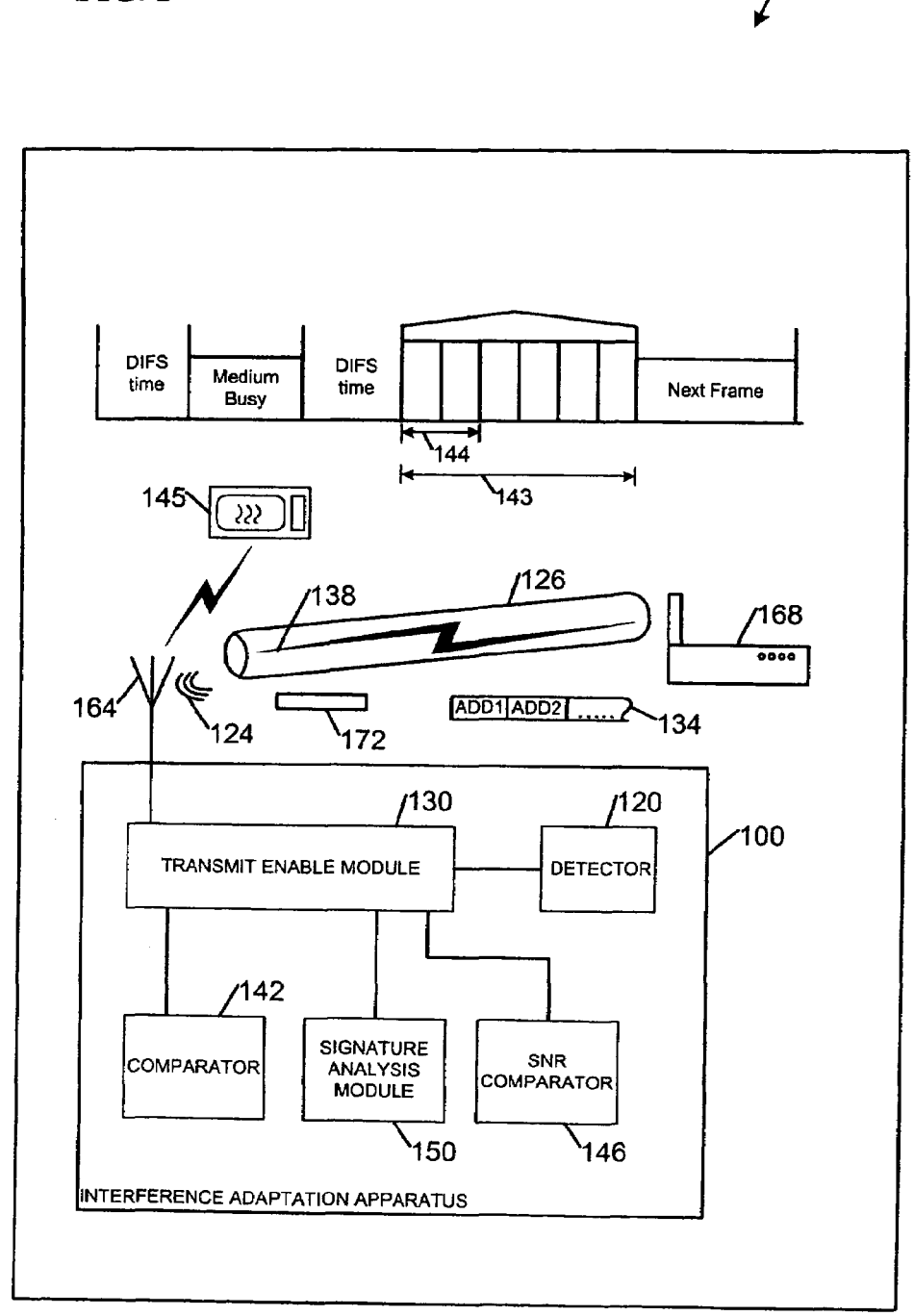
FIG. 1 is a block diagram of an apparatus and a system according to various embodiments of the invention.

FIG. 1 comprises a block diagram of an apparatus 100 and a system 160 according to various embodiments of the invention. The apparatus 100 may include a detector 120 to detect RF energy 124 at a frequency associated with at least one wireless networking channel 126.

The apparatus 100 may also include a contention window comparator 142 coupled to the detector 120. Various embodiments disclosed herein may operate to observe the behavior of a contention window and/or changes in a signal-to-noise ratio associated with signals originating from stations participating in a basic service set (BSS). Since the contention window size may grow to a maximum in the presence of a non-coherent interferer, a large window size may indicate that received RF energy in the channel comprises non-coherent noise. For more information regarding theoretical contention window size, please see "Dynamic Tuning of the IEEE 802.11 Protocol to Achieve a Theoretical Throughput Limit" by Frederico Cali and Marco Conti, IEEE/ACM Transactions on Networking, Vol. 8, No. 6, December 2000. See also "A Capacity Analysis for the IEEE 802.11 MAC Protocol" by Y. C. Tay and K. C. Chua, Wireless Networks Vol. 7, 159-171, 2001.

Thus, the contention window comparator 142 may compare an actual contention window size 143 to an estimated contention window size 144, to determine whether or not the RF energy 124 is associated with a wireless networking transmission 138. In some embodiments of the apparatus 100, the estimated contention window size 144 may be estimated from a number comprising a count of nodes included in the basic service set (BSS).

Some embodiments of the apparatus 100 may also include a transmit enable module 130 coupled to the contention window comparator 142 to determine whether the RF energy 124 is associated with a wireless networking transmission 138, and/or to enable data frame transmission 134. While the transmit enable module may be coupled directly to an antenna, it may also be indirectly coupled to an antenna. For example, in some embodiments the transmit enable module 130 may comprise a transmitter or transceiver (not shown) coupled, in turn, to an antenna. The transmit enable module 130 may also be coupled directly to a transmitter or transceiver (not shown) that are coupled to an antenna. In any of these cases, transmission 134 may be responsive to determining that the RF energy 124 is not associated with the wireless networking transmission 138 (e.g., the source of the RF energy is a non-coherent source, such as a microwave oven 145).

Signature analysis of the received energy, including a spectral analysis, may be used to differentiate between coherent and non-coherent RF energy. Thus, some embodiments of the apparatus 100 may also include a signature analysis module 150 coupled to the detector 120 and/or to the transmit enable module 130 to perform a signature analysis of the RF energy 124. Results of the signature analysis may be used to determine whether the RF energy 124 is associated with a wireless networking transmission 138.

A decreased SNR and/or an increased noise threshold may also be an indication of noise. Thus, the apparatus 100 may also include a signal-to-noise ratio comparator 146 coupled to the transmit enable module 130 to determine whether the RF energy 124 is associated with a wireless networking transmission 138. It should be noted that the contention window comparator 142, the signal-to-noise ratio comparator 146, and/or the signature analysis module 150 may act singly or in any combination.

In some embodiments of the apparatus 100, the wireless networking channel 126 may comprises an Institute of Electrical and Electronics Engineers (IEEE) 802.11 channel. The wireless networking transmission 138 may, in some embodiments of the apparatus 100, comprise an IEEE 802.11 transmission. Other embodiments may be realized.

For example, a system 160 may include an apparatus 100 as well as an antenna 164 (e.g., an omnidirectional antenna, a patch antenna, a dipole antenna, among others) coupled to a transmit enable module 130. The system 160 may also include a wireless networking device 168 to originate a wireless networking transmission 138. The system 160 may further include a data packet 172 to be transmitted during the wireless transmission 138, and/or a contention window comparator 142 coupled to the transmit enable module 130 to determine whether or not RF energy 124 is associated with the wireless networking transmission 138.

The apparatus 100, detector 120, energy 124, channel 126, transmit enable module 130, data frame transmission 134, wireless networking transmission 138, contention window comparator 142, actual contention window size 143, estimated contention window size 144, microwave oven 145, signal-to-noise ratio comparator 146, signature analysis module 150, system 160, omnidirectional antenna 164, wireless networking device 168, and data packet 172 may all be characterized as "modules" herein.

Such modules may include hardware circuitry, single and/or multi-processor circuits, memory circuits, software program modules and objects, and/or firmware, and combinations thereof, as desired by the architect of the apparatus 100 and system 160, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in applications other than interference adaptation of IEEE 802.11 back-off procedures, and thus, various embodiments are not to be so limited. The illustrations of apparatus 100 and systems 160 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single and/or multi-processor modules, single and/or multiple embedded processors, data switches, and application-specific modules, including multi-layer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
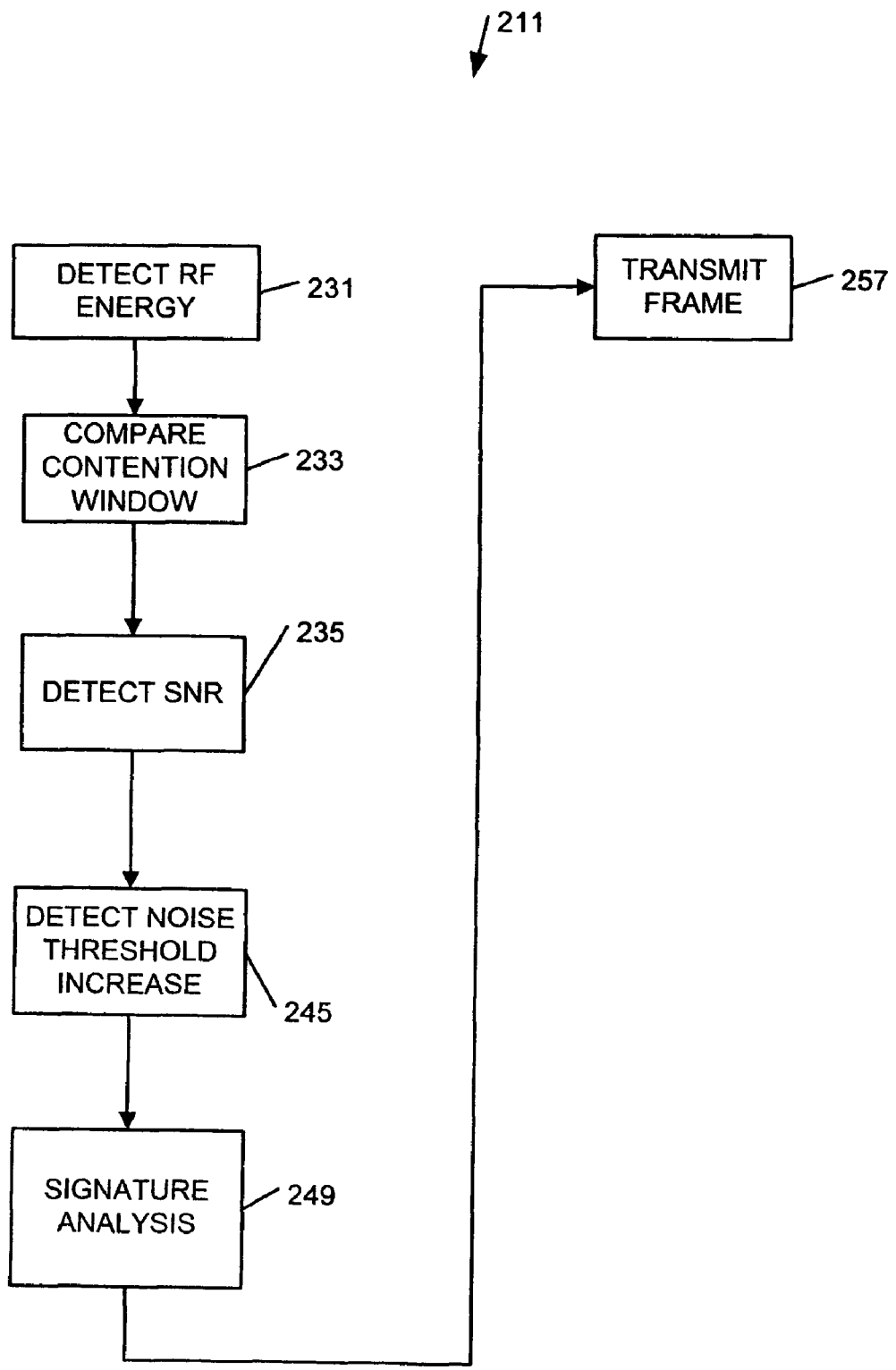
FIG. 2 is a flow diagram illustrating several methods according to various embodiments of the invention.

For example, FIG. 2 is a flow diagram illustrating several methods 211 according to various embodiments of the invention. Various techniques may be utilized to determine whether received RF energy is associated with a wireless networking transmission (e.g., an IEEE 802.11 transmission). Some techniques for differentiating between coherent and non-coherent energy (e.g., spectral analysis) may be more effective than others, but may be more resource-intensive. Thus, some methods may combine two or more techniques sequentially or in parallel to conserve resources.

One such method 211 may, for example, begin at block 231 with detecting RF energy at a frequency associated with at least one wireless networking channel, such as an IEEE 802.11 channel. Method 211 may continue at block 233 with comparing an actual contention window size to an estimated contention window size. Method 211 may include detecting that a signal-to-noise ratio has decreased by a selected amount during a selected period of time, at block 235, and/or detecting an increase in a noise threshold at block 245. Method 211 may include performing a signature analysis of the RF energy at block 249, including a spectral analysis. Method 211 may conclude with transmitting a data frame responsive to determining that the RF energy is not associated with a wireless networking transmission at block 257. The data frame may arrive at a receiver undamaged, since a spectral footprint of a non-coherent interferer may be different from that of a wireless networking transmission. Transmitting data frames in the presence of a non-coherent interferer may thus increase a wireless system throughput.

It should be noted that the methods described herein do not have to be executed in the order described, or in any particular order. Moreover, various activities described with respect to the methods identified herein can be executed in repetitive, serial, or parallel fashion. Information, including parameter values, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
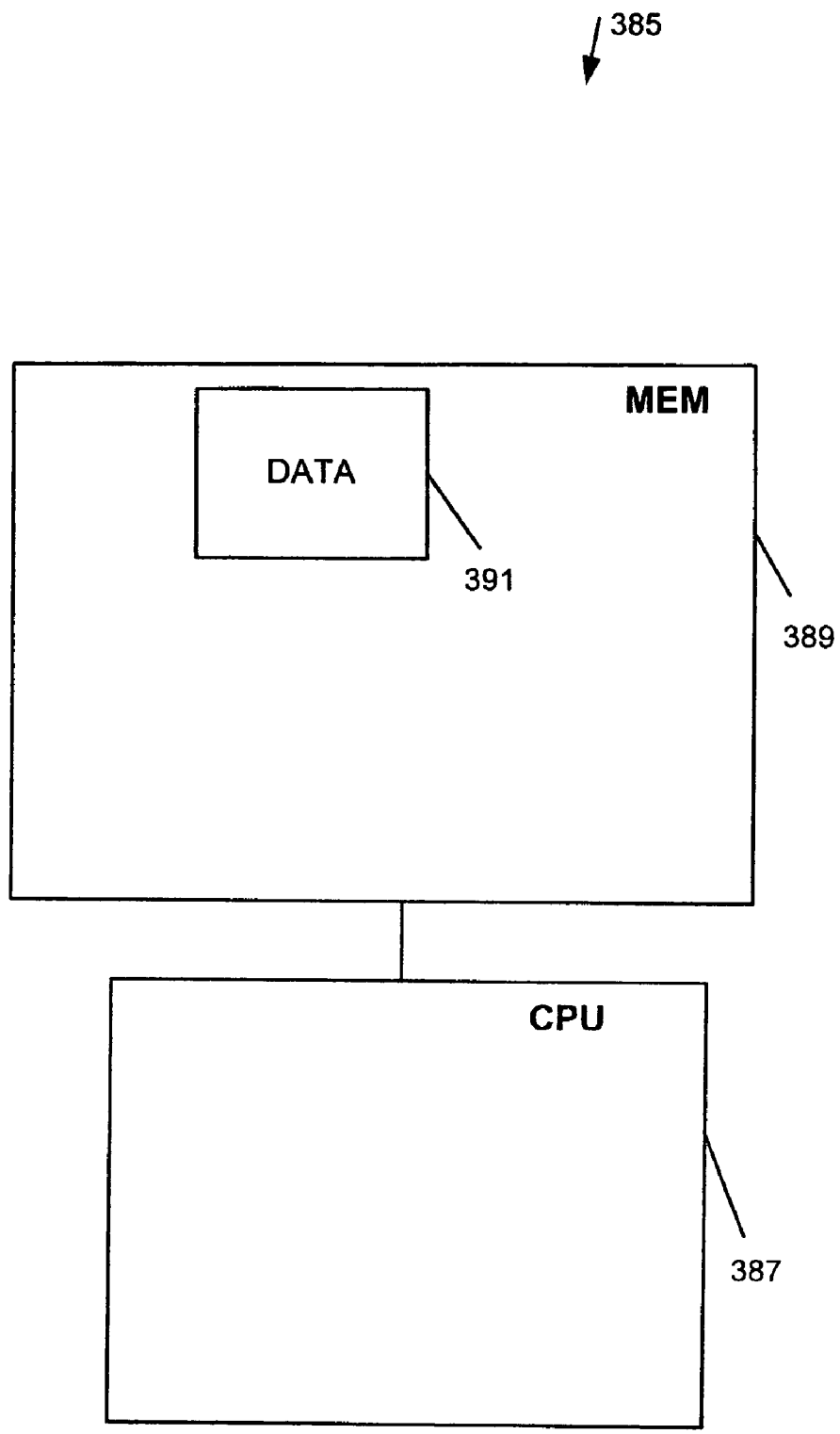
FIG. 3 is a block diagram of an article according to various embodiments of the invention.

For example, FIG. 3 is a block diagram of an article 385 according to various embodiments of the invention. Such embodiments may include a computer, a memory system, a magnetic or optical disk, some other storage device, and/or any type of electronic device or system. The article 385 may include one or more processors 387 coupled to a machine-accessible medium such as a memory 389 (e.g., a memory including an electrical, optical, or electromagnetic conductor) having associated information 391 (e.g., computer program instructions and/or data), which, when accessed, results in a machine (e.g., the one or more processors 387) performing such actions as detecting RF energy at a frequency associated with at least one wireless networking channel, including perhaps an IEEE 802.11 channel.

Other activities may include transmitting a data frame responsive to determining that the RF energy is not associated with a wireless networking transmission, such as an IEEE 802.11 transmission. Further activities may include comparing an actual contention window size to a theoretical contention window size, and/or detecting an increase in a noise threshold. Finally, such activities may include performing a signature analysis of the RF energy.

Implementing the apparatus, systems, and methods disclosed herein may increase wireless communication system throughput. In some embodiments, this may occur by enabling packet transmission during a time when a wireless networking device performs sequential back-off operations in the presence of spectral energy originated from a non-coherent interference source.

Although the inventive concept may be discussed in the exemplary context of an 802.xx implementation (e.g., 802.11a, 802.11g, 802.11 HT, 802.16, etc.), the claims are not so limited. Indeed, embodiments of the present invention may well be implemented as part of any wired and/or wireless system Examples may also include embodiments comprising multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

The accompanying drawings that form a part hereof show by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
   a detector to detect radio-frequency (RF) energy at a frequency associated with at least one wireless networking channel;
   a contention window comparator coupled to the detector to compare an actual contention window size to an estimated contention window size to determine whether the RF energy is associated with a wireless networking transmission; and
   a transmit enable module coupled to the contention window comparator to enable data frame transmission responsive to determining that the RF energy is not associated with a wireless networking transmission.

2. The apparatus of claim 1, wherein the estimated contention window size is estimated from a number comprising a count of nodes included in a basic service set (BSS).

3. The apparatus of claim 1, further including:
   a signature analysis module coupled to the detector to perform a signature analysis of the RF energy.

4. A system, including:
   a detector to detect radio-frequency (RF) energy at a frequency associated with at least one wireless networking channel;
   a contention window comparator coupled to the transmit enable module to determine whether the RF energy is associated with a wireless networking transmission;
   a transmit enable module coupled to the detector to enable data frame transmission responsive to determining that the RF energy is not associated with a wireless networking transmission; and
   an omnidirectional antenna coupled to the transmit enable module.

5. The system of claim 4, further including:
   a wireless networking device to originate the wireless networking transmission.

6. A method, including:
   detecting radio-frequency (RF) energy at a frequency associated with at least one wireless networking channel;
   comparing an actual contention window size to an estimated contention window size;
   determining that the RF energy is associated with noise if the actual contention window size is substantially greater than the estimated contention window size; and
   foregoing back-off and transmitting a data frame responsive to determining that the RF energy is associated with the noise.

7. The method of claim 6, wherein the wireless networking channel comprises an Institute of Electrical and Electronics Engineers (IEEE) 802.11 channel.

8. The method of claim 6, wherein the wireless networking transmission comprises an Institute of Electrical and Electronics Engineers (IEEE) 802.11 transmission.

9. The method of claim 6, further including:
   performing a signature analysis of the RF energy.

10. The method of claim 9, wherein the signature analysis comprises a spectral analysis.

11. The method of claim 6, further including:
detecting that a signal-to-noise ratio has decreased by a selected amount during a selected period of time.

12. The method of claim 11, further including:
performing a signature analysis of the RF energy.

13. An article including a machine-accessible medium having associated information, wherein the information, when accessed, results in a machine performing:
detecting radio-frequency (RF) energy at a frequency associated with at least one wireless networking channel;
comparing an actual contention window size to an estimated contention window size;
determining that the RF energy is associated with noise if the actual contention window size is substantially greater than the estimated contention window size; and
foregoing back-off and transmitting a data frame responsive to determining that the RF energy is associated with the noise.

14. The article of claim 13, wherein the wireless networking channel comprises an Institute of Electrical and Electronics Engineers (IEEE) 802.11 channel, and wherein the wireless networking transmission comprises an IEEE 802.11 transmission.

15. The article of claim 13, wherein the information, when accessed, results in a machine performing:
performing a signature analysis of the RF energy.

16. The article of claim 13, wherein the information, when accessed, results in a machine performing:
detecting an increase in a noise threshold.

* * * * *